United States Patent
Moury

(10) Patent No.: US 10,525,943 B2
(45) Date of Patent: Jan. 7, 2020

(54) AUTOMATED VEHICLE CONTROL SYSTEM WITH MULTIPLE BRAKE-PEDAL SELECTED DISENGAGEMENT MODES

(71) Applicant: Aptiv Technologies Limited, St. Michael (BB)

(72) Inventor: Michael T. Moury, Shelby Township, MI (US)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 15/436,907

(22) Filed: Feb. 20, 2017

(65) Prior Publication Data

US 2018/0236983 A1     Aug. 23, 2018

(51) Int. Cl.
B60T 7/04     (2006.01)

(52) U.S. Cl.
CPC .......... B60T 7/042 (2013.01); *B60T 2201/02* (2013.01); *B60T 2220/04* (2013.01)

(58) Field of Classification Search
CPC .... B60W 50/082; B60W 50/10; B60W 30/14; B60T 7/042; B60T 2220/04; B60T 2201/02; B60T 7/22
See application file for complete search history.

(56) References Cited

U.S. PATENT DOCUMENTS

| | | | | |
|---|---|---|---|---|
| 5,454,442 A * | 10/1995 | Labuhn | ............. | B60K 31/0008 180/169 |
| 6,622,810 B2 * | 9/2003 | Labuhn | ............. | B60K 31/0008 180/169 |
| 7,457,699 B2 * | 11/2008 | Chia | .................. | B60K 31/0008 701/301 |
| 9,725,095 B2 * | 8/2017 | Carlson | .............. | F16H 61/0213 |
| 2002/0152015 A1 * | 10/2002 | Seto | .................... | B60K 31/0008 701/96 |
| 2003/0195667 A1 * | 10/2003 | Tange | ................ | B60K 31/0008 701/1 |
| 2006/0155469 A1 * | 7/2006 | Kawasaki | ............. | B60R 21/013 701/301 |
| 2007/0182243 A1 | 8/2007 | Osborn et al. | | |
| 2007/0215401 A1 * | 9/2007 | Braeuchle | .......... | B60K 31/0008 180/170 |
| 2012/0083987 A1 * | 4/2012 | Schwindt | .............. | B60W 30/16 701/96 |
| 2013/0100369 A1 | 5/2013 | Breu | | |
| 2014/0167493 A1 * | 6/2014 | Kuhlman | .............. | B60T 13/142 303/3 |

(Continued)

FOREIGN PATENT DOCUMENTS

EP     3 045 369 A1     7/2016

*Primary Examiner* — Mussa A Shaawat
(74) *Attorney, Agent, or Firm* — Joseph V. Bonadies

(57) ABSTRACT

A control system with multiple brake-pedal selected disengagement-modes for an automated vehicle includes a brake-pedal and a controller. The brake-pedal is used to detect a plurality of pedal-action-classifications based on one of pedal-force, depression-duration, and a combination of pedal-force and depression-duration. The controller is in communication with the brake-pedal. The controller operates the system into a first-mode in response to the brake-pedal being operated in accordance with a first-action-classification, and into a second-mode in response to the brake-pedal being operated in accordance with a second-action-classification different from the first-action-classification.

8 Claims, 2 Drawing Sheets

(56) References Cited

U.S. PATENT DOCUMENTS

| | | | |
|---|---|---|---|
| 2015/0260143 A1* | 9/2015 | Yorke | F02N 11/0822 |
| | | | 701/112 |
| 2016/0107648 A1* | 4/2016 | Carlson | F16H 61/0213 |
| | | | 477/107 |
| 2016/0264117 A1* | 9/2016 | Deng | B60T 11/18 |
| 2016/0280236 A1 | 9/2016 | Otsuka | |
| 2017/0017233 A1 | 1/2017 | Ichikawa et al. | |
| 2017/0371338 A1* | 12/2017 | Kamata | G05D 1/0214 |

\* cited by examiner

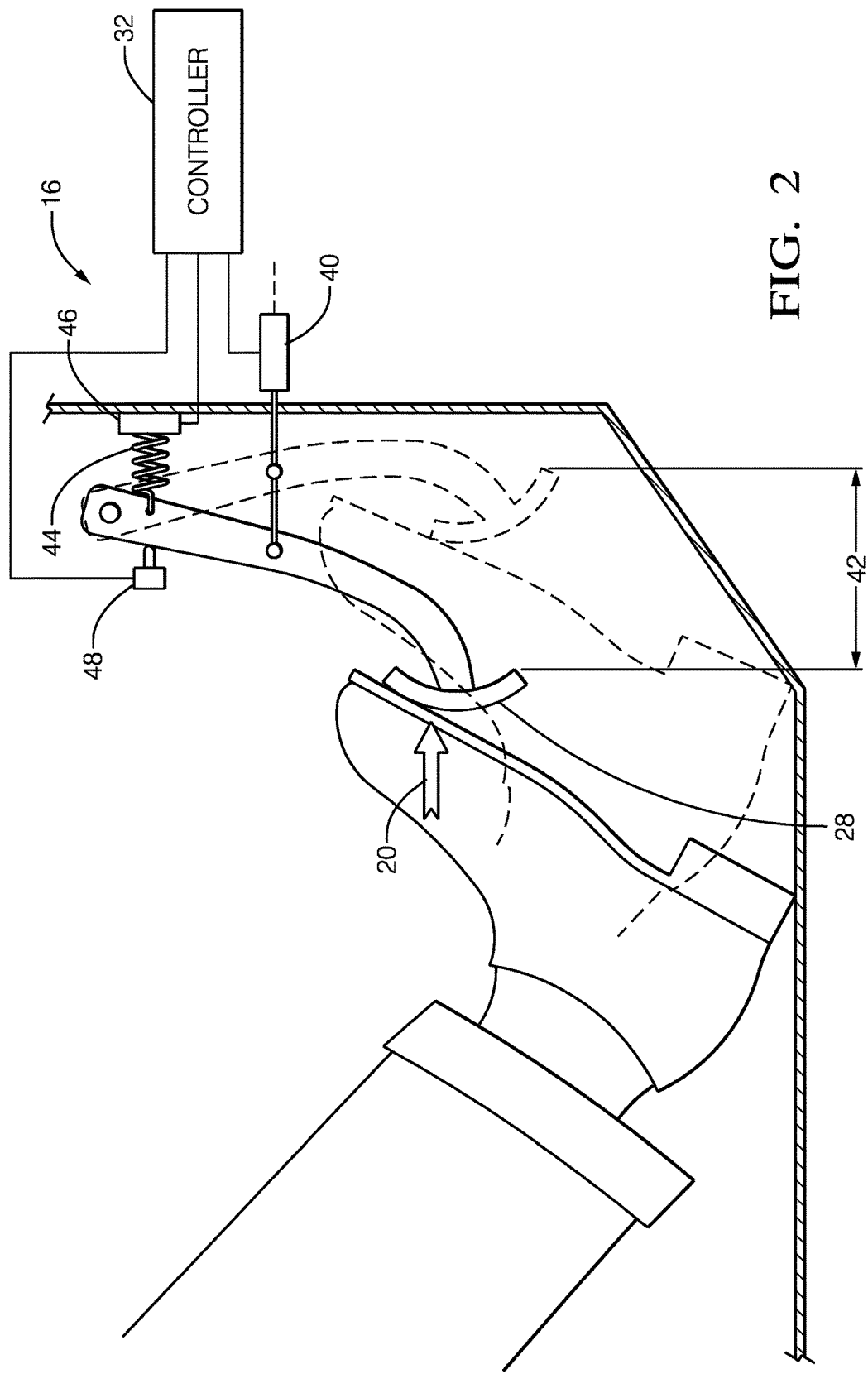

AUTOMATED VEHICLE CONTROL SYSTEM WITH MULTIPLE BRAKE-PEDAL SELECTED DISENGAGEMENT MODES

TECHNICAL FIELD OF INVENTION

This disclosure generally relates to a vehicle control system, and more particularly relates system with multiple brake-pedal selected disengagement-modes that are selected based on pedal-force, depression-duration, or a combination of pedal-force and depression-duration.

BACKGROUND OF INVENTION

Adaptive Cruise Control (ACC) systems that control the speed of a host-vehicle relative to other-vehicles proximate to the host-vehicle are known. However, instances of inadvertent disengagement of the ACC has been observed where an operator of the host-vehicle accidently and imperceptibly (to the operator) pressed the brake-pedal while trying to maintain his/her foot in a 'ready' position. This can lead to a situation where the operator is unpleasantly surprised when the headway gap between the host-vehicle an other-vehicle forward of the host-vehicle unexpectedly decreased because the ACC has been inadvertently disengaged.

SUMMARY OF THE INVENTION

In accordance with one embodiment, a control system with multiple brake-pedal selected disengagement-modes for an automated vehicle is provided. The system includes a brake-pedal and a controller. The brake-pedal is used to detect a plurality of pedal-action-classifications based on one of pedal-force, depression-duration, and a combination of pedal-force and depression-duration. The controller is in communication with the brake-pedal. The controller operates the system into a first-mode in response to the brake-pedal being operated in accordance with a first-action-classification, and into a second-mode in response to the brake-pedal being operated in accordance with a second-action-classification different from the first-action-classification.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 2 is an illustration of a brake-pedal of the system of FIG. 1 in accordance with one embodiment.

DETAILED DESCRIPTION

Figure 1:
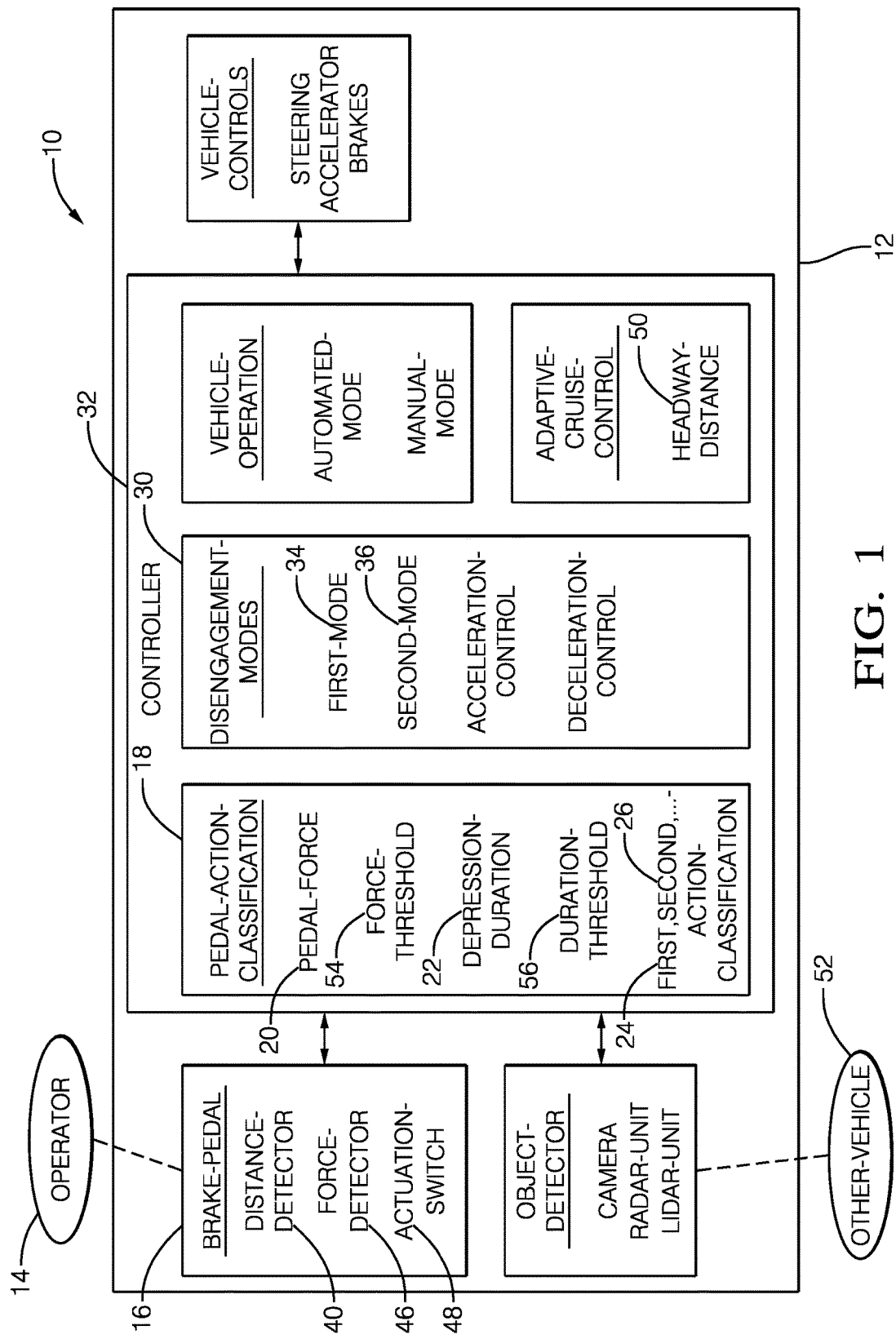
FIG. 1 is a diagram of a control system in accordance with one embodiment.

FIG. 1 illustrates a non-limiting example of a control system 10, for example an Active Cruise Control (ACC) system, hereafter referred to as the system 10. In general, the system 10 is configured or adapted to provide for multiple (i.e. a plurality of) brake-pedal-selected instances of disengagement-modes 30 for an automated vehicle, for example a host-vehicle 12. As used herein, the term automated vehicle may apply to instances when the host-vehicle 12 is being operated in an automated-mode, i.e. a fully autonomous mode, where a human-operator of the host-vehicle may do little more than designate a destination in order to operate the host-vehicle. However, full automation is not a requirement. It is contemplated that the teachings presented herein are useful when the host-vehicle 12 is operated in a cruise-control mode where the degree or level of automation is limited to speed control of the host-vehicle 12, and the human-operator steers the host-vehicle 12.

As will be recognized by those in the art, cruise control systems with a single disengagement-mode are known. That is, cruise control systems where the only response to operating (e.g. tapping or pressing) a brake pedal is to fully disengage the operation of the cruise control system are known. The typical action of these known single disengagement-mode cruise control systems in response brake-pedal operation is to allow the vehicle to coast where neither brakes nor accelerator are applied by the known cruise control systems when disengaged. As will be described in more detail below, the system 10 described herein has multiple instances of the disengagement-modes 30, one of which may be full disengagement which is the only option with known cruise control systems. However, the system 10 described here is an improvement over the prior art as the system 10 has one or more alternative disengagement-modes that are different from full-disengagement. As will also be explained in more detail below, which of the disengagement-modes 30 is activated may be selected by an operator 14 of the host-vehicle by operation of a brake-pedal 16 of the system 10 in accordance with the manner described herein.

The brake-pedal 16 of the system 10 is monitored to detect or determine a plurality of pedal-action-classifications 18 based on, but not limited to, pedal-force 20, depression-duration 22, or a combination of pedal-force 20 and depression-duration 22. That is, each of the disengagement-modes 30 may be selected by the operator 14 applying different amounts or degrees of pedal-force 20 and/or different time-intervals of depression-duration 22 to the brake-pedal 16, i.e. both the pedal-force 20 and the depression-duration 22 may be used in combination to determine which of the disengagement-modes 30 is desired by the operator 14.

In order to determine when the aforementioned different amounts of pedal-force 20 and/or different time-intervals occur, the system 10 may include a controller 32 in communication with the brake-pedal 16. The communication may be by way of wires or optical cable, and may be in the form of analog or digital signals, as will be recognized by those in the art. The controller 32 may include a processor (not specifically shown) such as a microprocessor or other control circuitry such as analog and/or digital control circuitry including an application specific integrated circuit (ASIC) for processing data as should be evident to those in the art. The controller 32 may include memory (not specifically shown), including non-volatile memory, such as electrically erasable programmable read-only memory (EEPROM) for storing one or more routines, thresholds, and captured data. The one or more routines may be executed by the processor to perform steps for determining which of the disengagement-modes 30 is desired by the operator 14 based on signals received by the controller 32.

FIG. 2 illustrates a non-limiting illustration of mechanical aspects of the brake-pedal 16. In one embodiment, the brake-pedal 16 may include a distance-detector 40 that indicates a pedal-deflection-distance 42 to the controller 32 that may be indicative of the pedal-force 20 because of the presence of a return-spring 44 as part of the brake-pedal 16.

Alternatively, the brake-pedal 16 may include a force-detector 46 that indicates the pedal-force 20 to the controller 32 by, for example, directly measuring the return-force generated by the return-spring 44. Alternatively, the pedal-force may be measured by a pressure-sensor (not shown) in the pedal-portion 28 of the brake-pedal 16, or by a pressure-sensor (not shown) in the hydraulic portion of a conventional automotive braking system.

The system 10, or more particularly the brake-pedal 16, may also include an actuation-switch 48 that provides an indication to the controller 32 of when the brake-pedal 16 has been pressed. The actuation-switch 48 may be the same as those used to disengage those known cruise control systems with single disengagement modes. The controller 32 may then determine the depression-duration 22 based on the indication of when (i.e. for how long of a time interval) the brake-pedal 16 has been pressed. It is also contemplated that the signals from the distance-detector 40 and/or the force-detector 46 could be used by the controller 32 do determine the depression-duration 22 by comparing those signals to appropriate thresholds.

Returning now to FIG. 1, the controller 32 may operate the system 10 into a first-mode 34 of the disengagement-modes 30 in response to the brake-pedal 16 being operated in accordance with a first-action-classification 24, and into a second-mode 36 of the disengagement-modes 30 in response to the brake-pedal being operated in accordance with a second-action-classification 26 different from the first-action-classification 24. The system 10 may, in some respects, be comparable to an adaptive-cruise-control-system where the accelerator and brakes may be operated by the controller 32 to maintain a headway-distance 50 between the host-vehicle 12 and an other-vehicle 52 located forward of the host-vehicle 12. Those in the art will recognize that the headway-distance 50 may be varied depending on a desired longitudinal separation selected by the driver and/or a speed of the host-vehicle 12. The first-mode 34 may be characterized by the disengaging of acceleration-control while maintaining deceleration-control. That is, while in the first-mode 34 the controller 32 may not command acceleration of the host-vehicle 12 to keep-up with the other-vehicle 52 located forward of the host-vehicle 12, but may command deceleration (e.g. decreased engine power and/or operate the brakes if necessary) to keep from getting too close to the other-vehicle 52. The second-mode 36 may be characterized by disengaging both acceleration-control and deceleration-control.

Non-limiting examples of the pedal-action-classifications 18 used to select an instance of the disengagement-modes 30 will now be described. The first-action-classification 24 may be characterized by the pedal-force 20 being less than a force-threshold 54 and the second-action-classification 26 may be characterized by the pedal-force 20 being not less than the force-threshold 54. That is, any pressing of the brake-pedal 16 with a force less than the force-threshold 54 would be interpreted to mean that the first-mode 34 of operation was desired, and pressing of the brake-pedal with a force greater than the force-threshold 54 would be interpreted to mean that the second-mode 36 of operation was desired.

Alternatively, the first-action-classification 24 may be characterized by the depression-duration 22 being less than a duration-threshold 56, and the second-action-classification 26 may be characterized by the depression-duration being not less than the duration-threshold. In other words, any pressing of the brake-pedal 16 with for a time-interval less than the duration-threshold 56 would be interpreted to mean that the first-mode 34 of operation was desired, and pressing of the brake-pedal for a time interval greater than the duration-threshold 56 would be interpreted to mean that the second-mode 36 of operation was desired.

Alternatively, the first-action-classification 24 may be characterized by the pedal-force 20 being less than a force-threshold 54 and the depression-duration 22 being less than a duration-threshold 56, and the second-action-classification 26 may be characterized by the pedal-force 20 being not less than the force-threshold 54 and the depression-duration 22 being not less than the duration-threshold 56. That is, any pressing of the brake-pedal 16 with a force less than the force-threshold 54 in combination with a time-interval less than the duration-threshold 56 would be interpreted to mean that the first-mode 34 of operation was desired, and pressing of the brake-pedal with a force greater than the force-threshold 54 in combination with pressing of the brake-pedal for a time interval greater than the duration-threshold 56 would be interpreted to mean that the second-mode 36 of operation was desired.

It is recognized that other alternatives are possible. For example a third-action-classification may be when the force-threshold 54 is exceeded, and time-interval is less than the duration-threshold 56, i.e. a brief but forceful operation of the brake-pedal 16. Another alternative is a long time-duration but gentle operation of the brake-pedal, i.e. when pedal-force 20 does not exceed the force-threshold 54 and depression-duration 22 is greater than the duration-threshold 56.

Accordingly, a control system with multiple brake-pedal selected disengagement-modes (the system 10), a controller 32 for the system 10, and a method of operating the system 10 is provided. The multiple instances of the disengagement-modes 30 allow for the operator 14 to easily customize the operation of the system 10. Also, if the operator 14 inadvertently touches the brake-pedal briefly and lightly, the system 10 may not be fully disengaged so the headway-distance 50 is at least kept from being too close.

While this invention has been described in terms of the preferred embodiments thereof, it is not intended to be so limited, but rather only to the extent set forth in the claims that follow.

I claim:

1. A control system with multiple brake-pedal selected disengagement-modes for an automated vehicle, said system comprising:
    a brake-pedal operated by a human-operator of a host-vehicle by pressing on the brake-pedal to indicate one of a plurality of disengagement-modes, said brake-pedal used to detect a plurality of pedal-action-classifications, each of the plurality of pedal-action-classifications corresponding to one of the plurality of disengagement-modes and based on one of pedal-force, depression-duration, and a combination of pedal-force and depression-duration;
    a controller in communication with the brake-pedal, wherein the controller operates the system into a first-mode in response to the brake-pedal being operated in accordance with a first-action-classification, and into a second-mode different from the first-mode in response to the brake-pedal being operated in accordance with a second-action-classification different from the first-action-classification.

2. The system in accordance with claim 1, wherein the brake-pedal includes a distance-detector that indicates a pedal-deflection-distance to the controller that is indicative of the pedal-force.

3. The system in accordance with claim 1, wherein the brake-pedal includes a force-detector that indicates the pedal-force to the controller.

4. The system in accordance with claim 1, wherein the brake-pedal includes an actuation-switch that provides an indication to the controller of when the brake-pedal has been pressed, and the controller determines the depression-duration based on the indication of when the brake-pedal has been pressed.

5. The system in accordance with claim 1, wherein the first-action-classification is characterized by the pedal-force being less than a force-threshold and the second-action-classification is characterized by the pedal-force being not less than the force-threshold.

6. The system in accordance with claim 1, wherein the first-action-classification is characterized by the depression-duration being less than a duration-threshold, and the second-action-classification is characterized by the depression-duration being not less than the duration-threshold.

7. The system in accordance with claim 1, wherein the first-action-classification is characterized by the pedal-force being less than a force-threshold and the depression-duration being less than a duration-threshold, and the second-action-classification is characterized by the pedal-force being not less than the force-threshold and the depression-duration being not less than the duration-threshold.

8. The system in accordance with claim 1, wherein the system is characterized as an adaptive-cruise-control-system, the first-mode is characterized by disengaging acceleration-control while maintaining deceleration-control, and the second-mode is characterized is characterized by disengaging both acceleration-control and deceleration-control.

\* \* \* \* \*